G. K. FARRINGTON.
Coffee Pot.
No. 26,945.
Patented Jan'y 24, 1860.
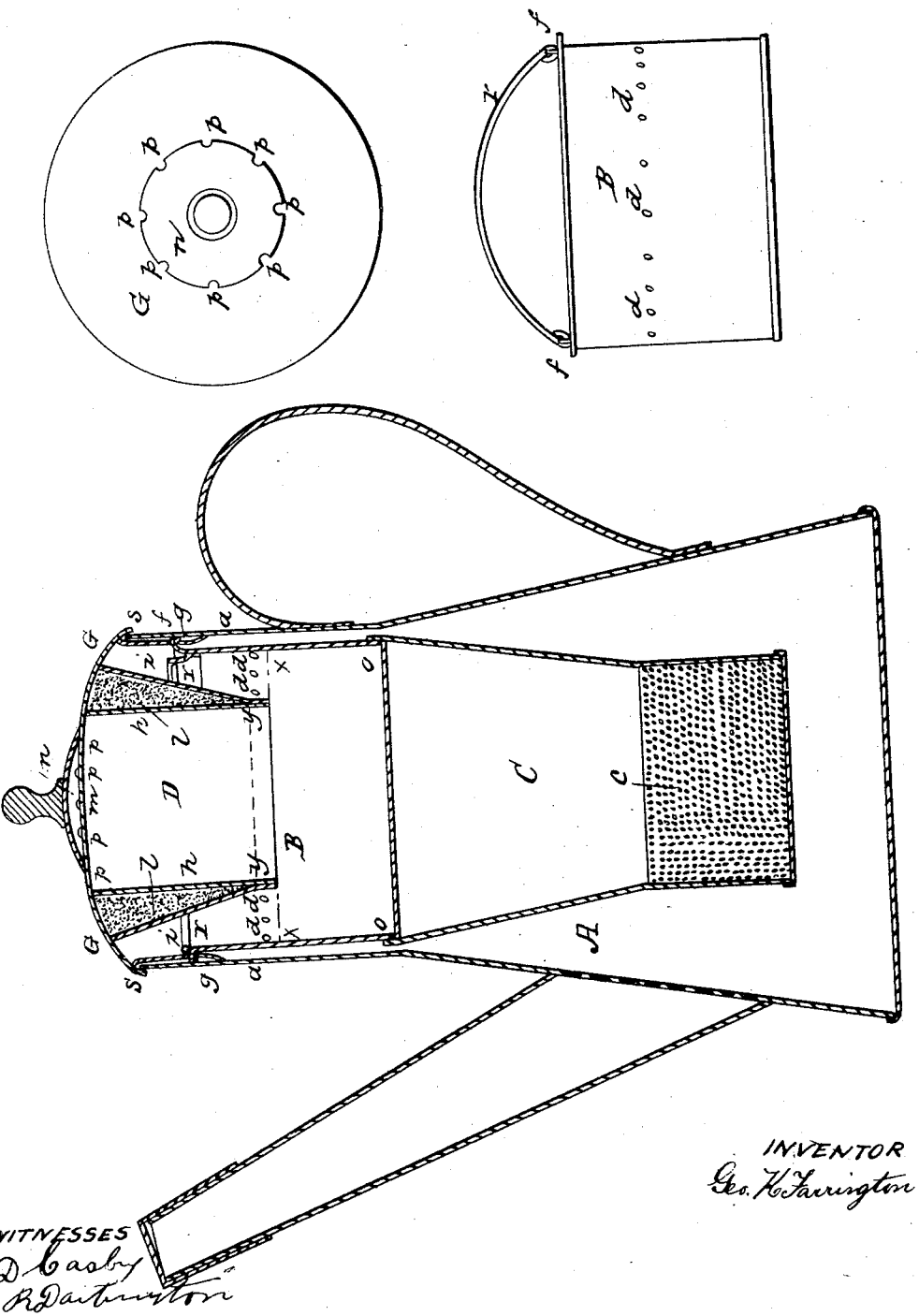
INVENTOR
Geo. K. Farrington
WITNESSES
D. Casby
R. Darrington

UNITED STATES PATENT OFFICE.

GEO. K. FARRINGTON, OF XENIA, OHIO, ASSIGNOR TO HIMSELF AND GEO. H. READ, OF SAME PLACE.

COFFEE-POT.

Specification of Letters Patent No. 26,945, dated January 24, 1860.

*To all whom it may concern:*

Be it known that I, GEORGE K. FARRINGTON, of Xenia, in the county of Greene and State of Ohio, have invented a new and Improved Coffee-Pot; and I do hereby declare that the following is a full and exact description thereof, reference being had to the accompanying drawings, making part of this specification.

Figure 1, is a central vertical section of a coffee pot provided with my improvements; Fig. 2, a plan of the top of the cover; Fig. 3, a side view of one of the parts detached.

Like letters designate corresponding parts in all the figures.

The body or pot A, of the coffee pot, may be of usual construction; but it is better to have the upper part $a$, cylindrical, instead of the conical form ordinarily given. On the inside, near the upper edge, are some small projections $g$, $g$, or their equivalents, upon which an outwardly projecting rim $f$, of my improved condenser B, rests, the rim well fitting into the pot A, while there is a narrow annular space between the condenser below and the pot. Thus the steam is allowed to pass freely up, by the side of the condenser, but its escape by the rim $f$, is nearly or entirely prevented. The cover G, which incloses the whole, also has a projecting edge $s$, turned down outside of the barrel thereof, thereby forming an annular groove, which fits closely over the upper edge of the pot A, and thus furnishes an additional security against the escape of the steam, except by the way intended.

A digester C, having its bottom and lower part $c$, finely perforated, is arranged so as to be attached to the condenser B, as shown at $o$, (Fig. 1,) so that the whole may be readily drawn out or inserted in the pot together; and yet so that the digester may be readily detached from the condenser, at pleasure.

Concentrically from the inside of the cover G, an inverted cup D, extends downward, such a distance, that its lower edge will reach to about half of the depth of the condenser B, when all parts are in place, as shown in Fig. 1. The diameter of this cup should be half or more, of the diameter of the condenser. The cup has double sides $h$, $i$, the space between which is occupied by plaster of paris, or other substance, $l$, which is a slow conductor of heat. At the top of the cup, is an aperture (or apertures) $m$, in the cover G, leading into a small chamber covered by the knob cap $n$, of said cover; and small perforations $p$, $p$, lead out of this chamber, substantially as represented.

The improved condenser B, has a set of small apertures $d$, $d$, through its sides, at the same height, which is a very little distance, say, about an eighth of an inch, above the lower edge of the cup D, when the parts are in place.

A description of the operation of the coffee pot constructed as above described, will show the use and advantages of the whole arrangement:—The pot A, having been provided with the desired quantity of boiling-hot water, a cap $b$, is placed over the end of the spout, to prevent the escape of steam there. The coffee is then placed in the digester C, which having been secured to the bottom of the condenser B, both are inserted together in the pot A. The condenser is then filled with cold water, up to the apertures $d$, $d$, through its sides; and the cover G, with its inverted cup D, is put in place, over all. As the steam from the beverage below, rises through the annular space around the condenser B, it is partly condensed by contact therewith; and the remainder enters, through the apertures $d$, $d$, into the condenser, over the cold water within, and more of it is there condensed. But whenever the steam accumulates so as to produce sufficient pressure on the water in the condenser to depress its surface, around the cup D, to the lower edge of said cup, (as indicated by the line $x$ $x$, Fig. 1,) and consequently to raise it, within said cup, say to the line $y$ $y$, in the same figure, it escapes around the lower edge of the cup, and passes up through the raised water within the cup, and imparts its aroma thereto; and, once in the cup D, it finally escapes through the apertures $m$, and $p$, $p$, without wasting any of the flavor of the coffee. The non-conducting substance $l$, keeps the interior of the cup comparatively cold, thus assisting the escape and condensation of the steam. As the water in the condenser B, accumulates, by the condensation of the steam, the overplus runs through the apertures $d$, $d$, into the pot below. Then, as this water becomes gradually heated more and more, it loses more of its condensing power; but still the steam is compelled to pass through it, and thereby yields up the escaping aroma. Thus, by not attempting to prevent the escape of steam, (which is impossible,) but directing its escape in the desired course; and by not endeavoring to entirely condense the steam, (which is also impracticable,) but causing what does escape, to part with its aroma, I perfectly gain the object desired, in a simple manner. There never can be any damage done by, nor danger of, the cover or any part blowing off by the force of the steam, the escape thereof being so regulated that but a slight pressure is required to relieve the pot, at all times.

What I claim as my invention and desire to secure by Letters Patent is—

The arrangement of the apertures $d, d,$ in the sides of the condenser B, at a uniform height, and in such relation to the bottom of the inverted cup D, as to keep the condensing water at a constant height, and low enough to allow the steam to escape at a pressure ordinarily obtained in the coffee pot, in combination with the vent apertures $m, p,$ or their equivalents, substantially as and for the purpose herein specified.

The above specification of my improved coffee pot signed by me, this 12th day of July, 1859.

GEO. K. FARRINGTON.

Witnesses:
R. PARTINGTON,
N. SMITH.